(12) United States Patent
Bunker et al.

(10) Patent No.: US 8,727,727 B2
(45) Date of Patent: May 20, 2014

(54) COMPONENTS WITH COOLING CHANNELS AND METHODS OF MANUFACTURE

(75) Inventors: Ronald Scott Bunker, Waterford, NY (US); Todd Garrett Wetzel, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 650 days.

(21) Appl. No.: 12/965,083

(22) Filed: Dec. 10, 2010

(65) Prior Publication Data
US 2012/0145371 A1    Jun. 14, 2012

(51) Int. Cl.
*F01D 5/18* (2006.01)

(52) U.S. Cl.
USPC ..................... 416/97 R; 416/241 R

(58) Field of Classification Search
USPC .... 416/97 R, 223 R, 232, 241 R, 96 R, 96 A, 416/241 B; 415/115, 200
See application file for complete search history.

(56) References Cited

U.S. PATENT DOCUMENTS

| | | | |
|---|---|---|---|
| 4,134,709 A * | 1/1979 | Eskesen | 416/1 |
| 5,075,966 A * | 12/1991 | Mantkowski | 29/890.01 |
| 5,626,462 A * | 5/1997 | Jackson et al. | 416/97 R |
| 5,640,767 A * | 6/1997 | Jackson et al. | 29/889.721 |
| 5,820,337 A * | 10/1998 | Jackson et al. | 415/200 |
| 5,875,549 A * | 3/1999 | McKinley | 29/889.2 |
| 6,214,248 B1 | 4/2001 | Browning et al. | |
| 6,234,755 B1 | 5/2001 | Bunker et al. | |
| 6,321,449 B2 * | 11/2001 | Zhao et al. | 29/890.01 |
| 6,368,060 B1 | 4/2002 | Fehrenbach et al. | |
| 6,412,541 B2 | 7/2002 | Roesler et al. | |
| 6,551,061 B2 * | 4/2003 | Darolia et al. | 416/97 A |
| 6,582,194 B1 * | 6/2003 | Birkner et al. | 416/97 R |
| 6,602,053 B2 | 8/2003 | Subramanian et al. | |
| 6,617,003 B1 * | 9/2003 | Lee et al. | 428/131 |
| 6,905,302 B2 * | 6/2005 | Lee et al. | 415/115 |
| 6,921,014 B2 * | 7/2005 | Hasz et al. | 228/122.1 |

(Continued)

FOREIGN PATENT DOCUMENTS

EP    1387040 B1    4/2004

OTHER PUBLICATIONS

D.G. Hyams et al., "A Detailed Analysis of film Cooling Physics: Part III—Streamwise Injection With Shaped Holes," Journal of Turbomachinery, vol. 122, Issue 1, Jan. 2000, pp. 122-132.

(Continued)

*Primary Examiner* — Edward Look
*Assistant Examiner* — William Grigos
(74) *Attorney, Agent, or Firm* — Ann M. Agosti

(57) ABSTRACT

A component is disclosed. The component includes a substrate comprising an outer surface and an inner surface. The inner surface defines at least one hollow, interior space, and the outer surface defines one or more grooves that extend at least partially along the outer substrate surface and have a respective base. One or more access holes are formed through the base of a respective groove, to connect the groove in fluid communication with the respective hollow interior space. The component further includes a coating comprising one or more layers disposed over at least a portion of the outer substrate surface. The groove(s) and the coating together define one or more channels for cooling the component. One or more trenches are formed through one or more coating layers and at least partially define at least one exit region for the cooling channel(s). A method of fabricating a component is also provided.

23 Claims, 9 Drawing Sheets

(56) References Cited

U.S. PATENT DOCUMENTS

| | | | |
|---|---|---|---|
| 7,014,923 | B2 | 3/2006 | Schnell et al. |
| 7,094,475 | B2 | 8/2006 | Schnell et al. |
| 7,186,167 | B2 | 3/2007 | Joslin |
| 7,302,990 | B2 | 12/2007 | Bunker et al. |
| 7,553,534 | B2* | 6/2009 | Bunker ............... 428/137 |
| 7,744,348 | B2 | 6/2010 | Bezencon et al. |
| 2010/0028131 | A1* | 2/2010 | Arrell et al. .......... 415/115 |
| 2010/0080688 | A1 | 4/2010 | Bezencon et al. |

OTHER PUBLICATIONS

B. Wei et al., "Curved Electrode and Electrochemical Machining Method and Assembly Employing the Same," U.S. Appl. No. 12/562,568, filed Sep. 18, 2009.

W. Zhang et al., Process and System for Forming Shaped Air Holes, U.S. Appl. No. 12/697,005, filed Jan. 29, 2010.

B.P. Lacy et al., "Hot Gas Path Component Cooling System," U.S. Appl. No. 12/765,372, filed Apr. 22, 2010.

B. Lacy et a., "Articles Which Include Chevron Film Cooling Holes, and Related Processes," U.S. Appl. No. 12/690,675, filed May 28, 2010.

J.E.J. Lambie et al., "An overview on micro-meso manufacturing techniques for micro-eat exchangers for turbine blade cooling," International Journal Manufacturing Research, vol. 3, No. 1, 2008, pp. 3-26.

Ronald Scott Bunker et al., "Components With Re-Entrant Shaped Cooling Channels and Methods of Manufacture," U.S. Appl. No. 12/943,624, filed Nov. 10, 2010.

Ronald Scott Bunker et al., "Component and Methods of Fabricating and Coating a Component," U.S. Appl. No. 12/943,646, filed Nov. 10, 2010.

Ronald Scott Bunker et al., "Method of Fabricating a Component Using a Fugitive Coating," U.S. Appl. No. 12/943,563, filed Nov. 10, 2010.

R.S. Bunker et al., "Turbine Components With Cooling Features and Methods of Manufacturing the Same," U.S. Appl. No. 12/953,177, filed Nov. 23, 2010.

* cited by examiner

COMPONENTS WITH COOLING CHANNELS AND METHODS OF MANUFACTURE

BACKGROUND

The invention relates generally to gas turbine engines, and, more specifically, to micro-channel cooling therein.

In a gas turbine engine, air is pressurized in a compressor and mixed with fuel in a combustor for generating hot combustion gases. Energy is extracted from the gases in a high pressure turbine (HPT), which powers the compressor, and in a low pressure turbine (LPT), which powers a fan in a turbofan aircraft engine application, or powers an external shaft for marine and industrial applications.

Engine efficiency increases with temperature of combustion gases. However, the combustion gases heat the various components along their flowpath, which in turn requires cooling thereof to achieve a long engine lifetime. Typically, the hot gas path components are cooled by bleeding air from the compressor. This cooling process reduces engine efficiency, as the bled air is not used in the combustion process.

Gas turbine engine cooling art is mature and includes numerous patents for various aspects of cooling circuits and features in the various hot gas path components. For example, the combustor includes radially outer and inner liners, which require cooling during operation. Turbine nozzles include hollow vanes supported between outer and inner bands, which also require cooling. Turbine rotor blades are hollow and typically include cooling circuits therein, with the blades being surrounded by turbine shrouds, which also require cooling. The hot combustion gases are discharged through an exhaust which may also be lined, and suitably cooled.

In all of these exemplary gas turbine engine components, thin metal walls of high strength superalloy metals are typically used for enhanced durability while minimizing the need for cooling thereof. Various cooling circuits and features are tailored for these individual components in their corresponding environments in the engine. For example, a series of internal cooling passages, or serpentines, may be formed in a hot gas path component. A cooling fluid may be provided to the serpentines from a plenum, and the cooling fluid may flow through the passages, cooling the hot gas path component substrate and coatings. However, this cooling strategy typically results in comparatively low heat transfer rates and non-uniform component temperature profiles.

Micro-channel cooling has the potential to significantly reduce cooling requirements by placing the cooling as close as possible to the heated region, thus reducing the temperature difference between the hot side and cold side of the main load bearing substrate material for a given heat transfer rate. However, current techniques for forming micro-channel cooled components typically require the formation of individual film exit holes for each of the micro-channels. As hot gas path components may include hundreds of micro-channels, the formation of film exit holes would thus necessitate the formation of hundreds of holes, which adds to the overall manufacturing cost of the component.

It would therefore be desirable to provide more economical and efficient means for forming exit regions for micro-channels.

BRIEF DESCRIPTION

One aspect of the present invention resides in component comprising a substrate having an outer surface and an inner surface. The inner surface defines at least one hollow, interior space, and the outer surface defines one or more grooves. Each groove extends at least partially along the outer surface of the substrate and has a respective base. One or more access holes are formed through the base of a respective groove, to connect the groove in fluid communication with respective ones of the at least one hollow interior space. The component further includes a coating comprising one or more layers disposed over at least a portion of the outer surface of the substrate. The groove(s) and the coating together define one or more channels for cooling the component. One or more trenches are formed through one or more layers of the coating and at least partially define at least one exit region for the one or more cooling channels.

Another aspect of the invention resides in a method of fabricating a component. The method includes forming one or more grooves in an outer surface of a substrate, which has at least one hollow interior space. Each groove extends at least partially along the outer surface of the substrate and has a respective base. The fabrication method further includes forming one or more access holes through the base of a respective groove, to connect the groove in fluid communication with respective ones of the at least one hollow interior space. The fabrication method further includes depositing a coating over at least a portion of the outer surface of the substrate, such that the groove(s) and the coating together define one or more channels for cooling the component. The fabrication method further includes forming one or more trenches through one or more layers of the coating to at least partially define at least one exit region for the cooling channel(s).

DRAWINGS

These and other features, aspects, and advantages of the present invention will become better understood when the following detailed description is read with reference to the accompanying drawings in which like characters represent like parts throughout the drawings, wherein.

Figure 3:
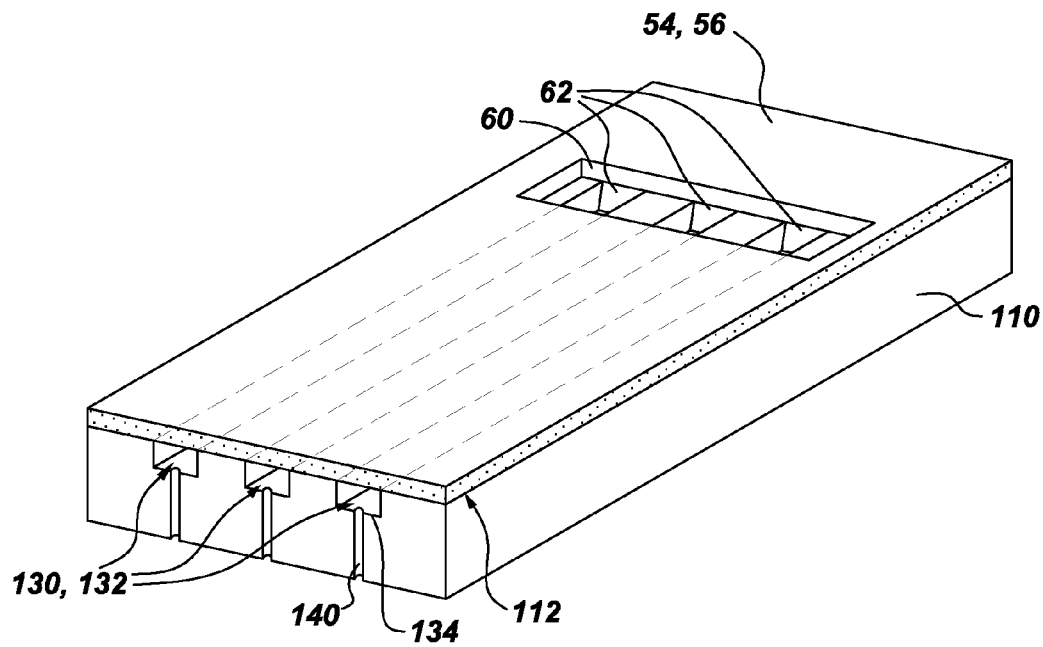
Figure 4:
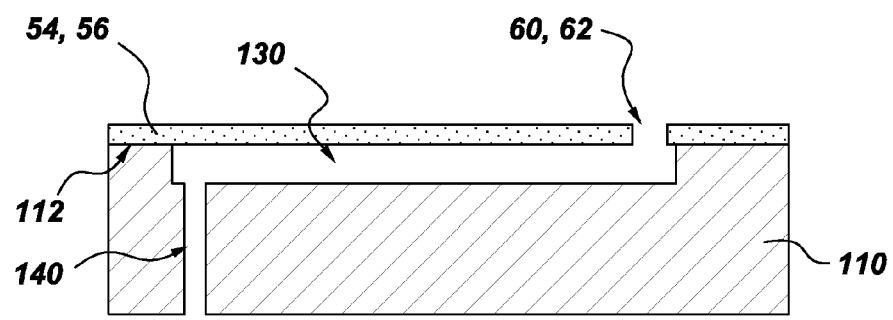
Figure 5:
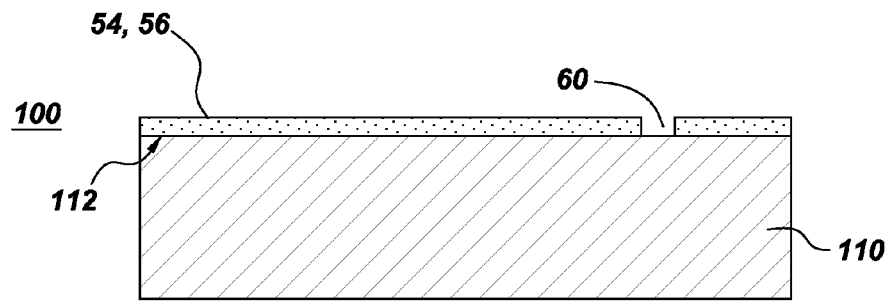
Figure 6:
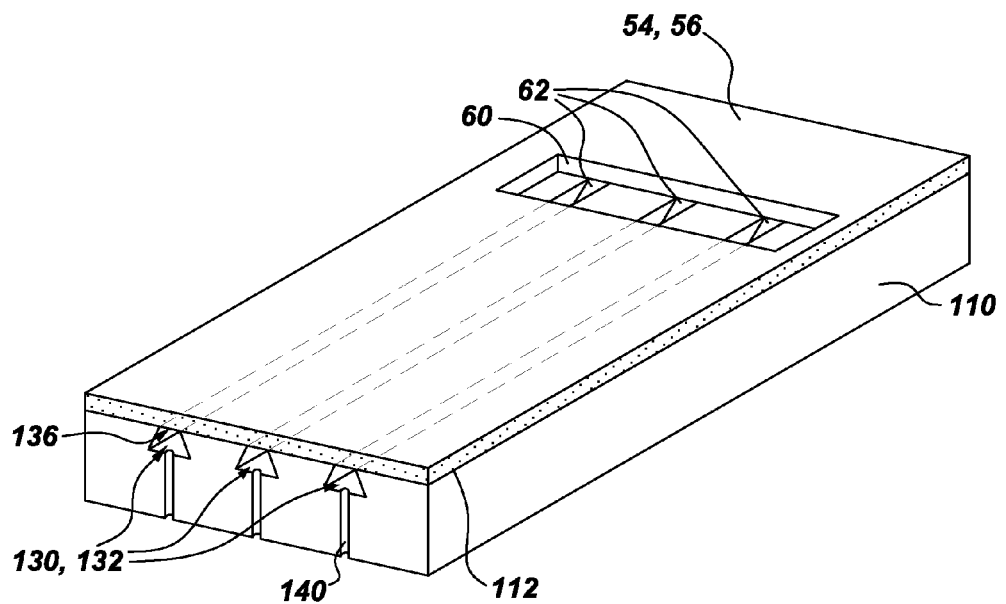
Figure 7:
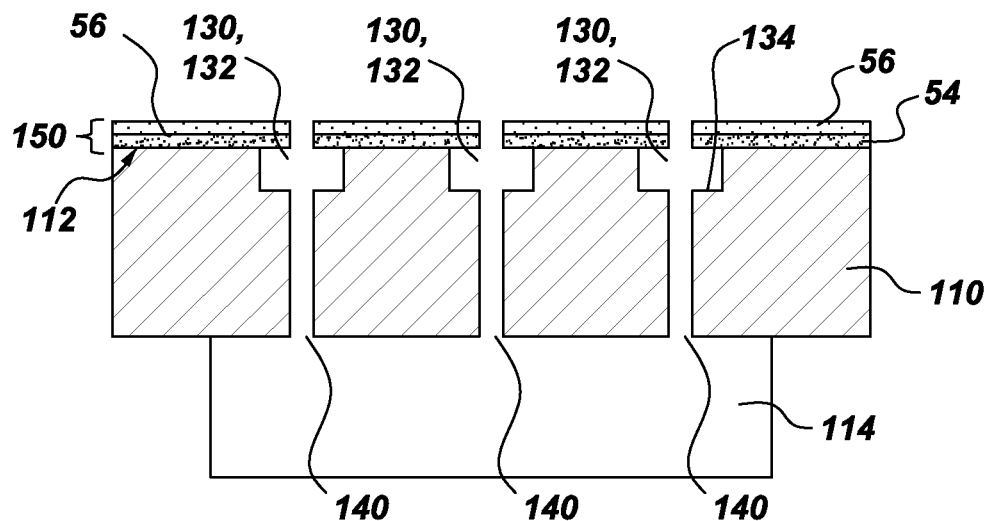
Figure 8:
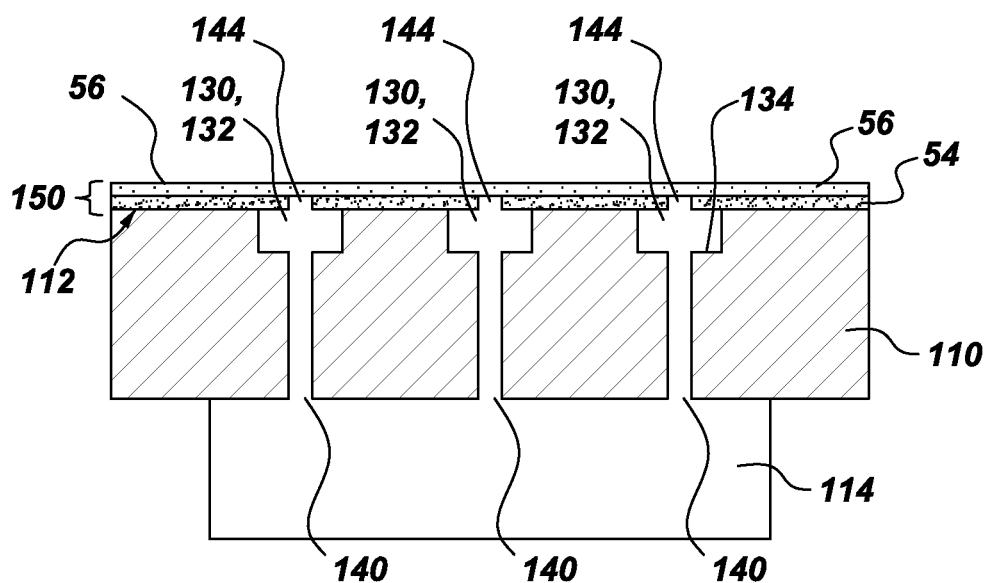
Figure 9:
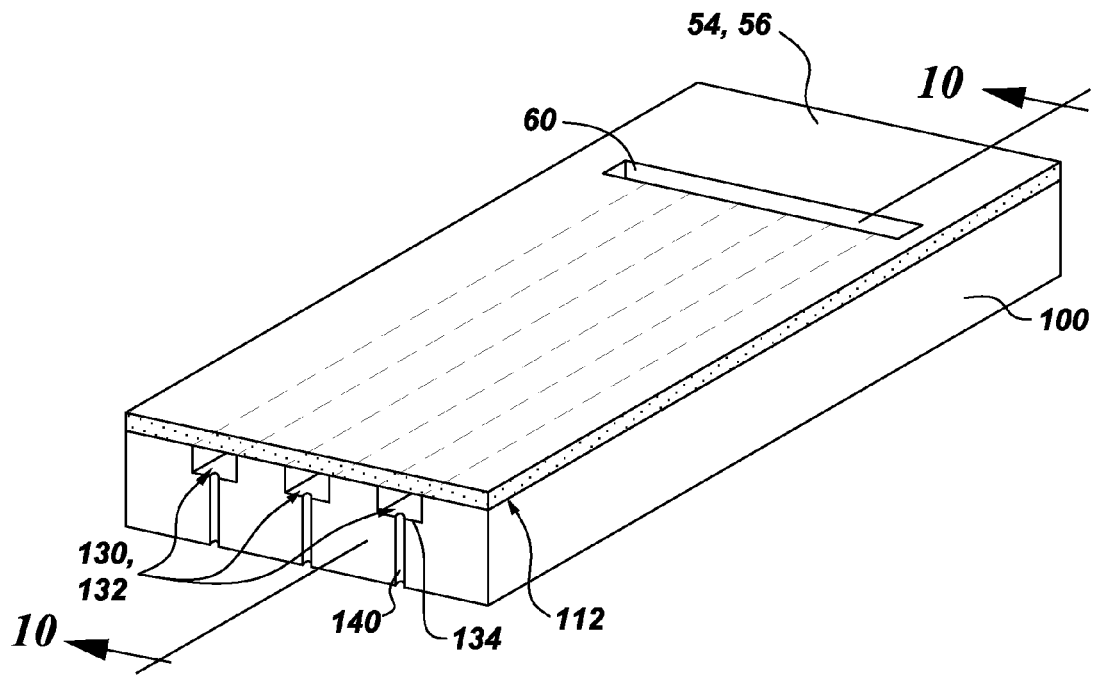
Figure 10:
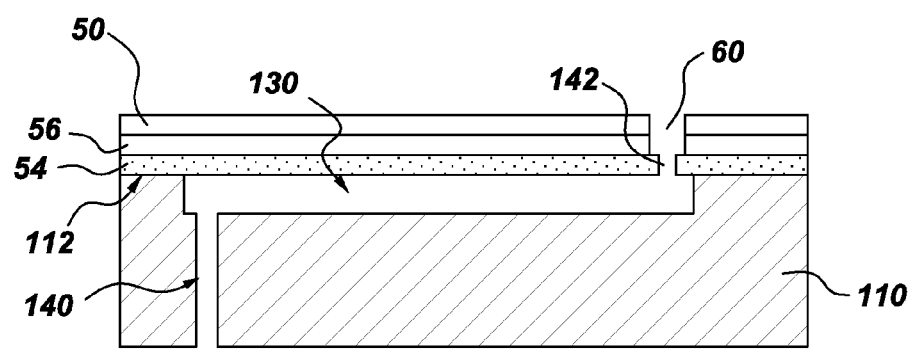
Figure 11:
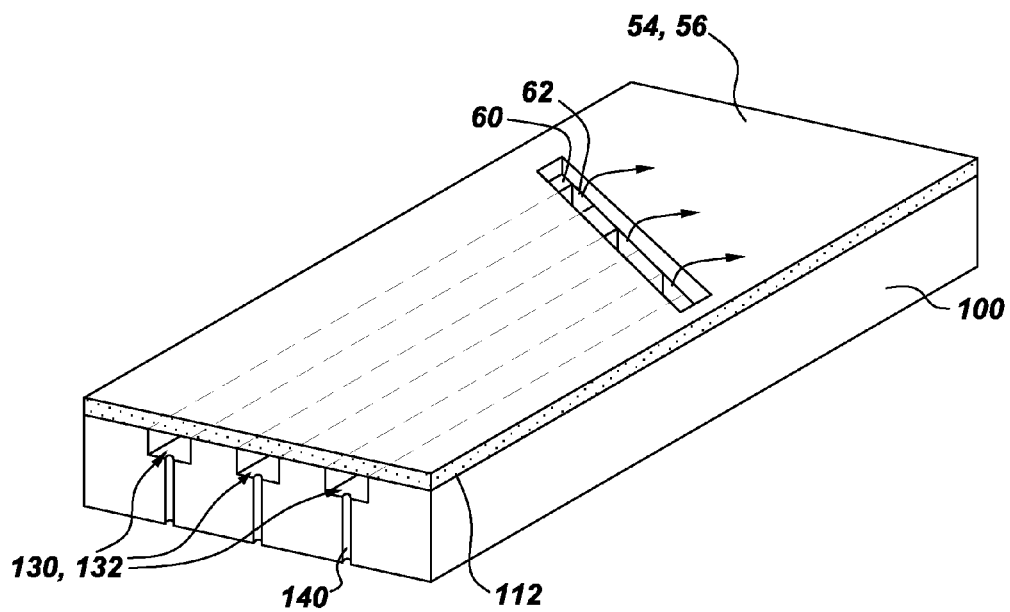
Figure 12:
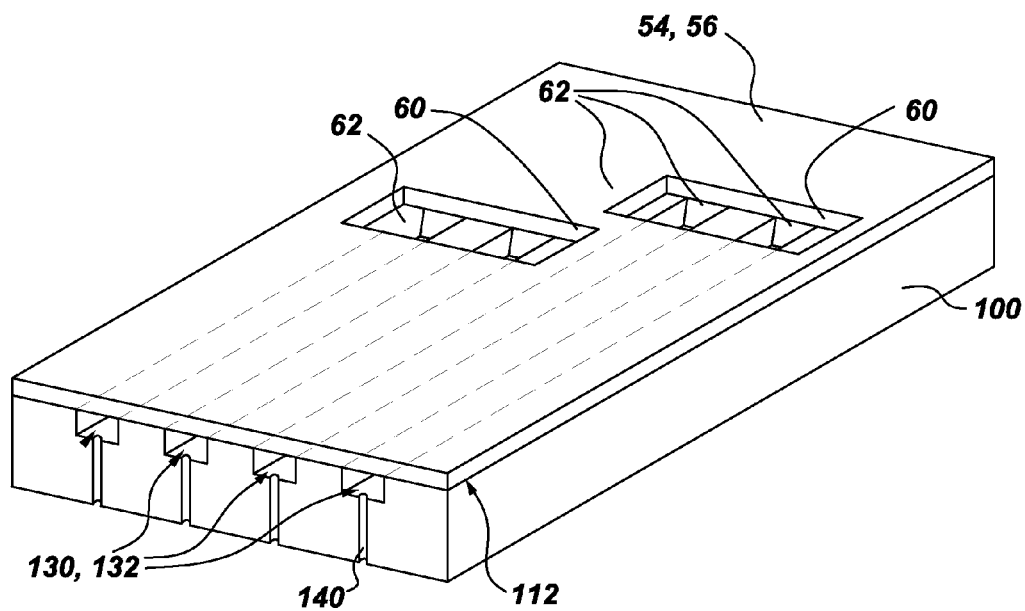
Figure 13:
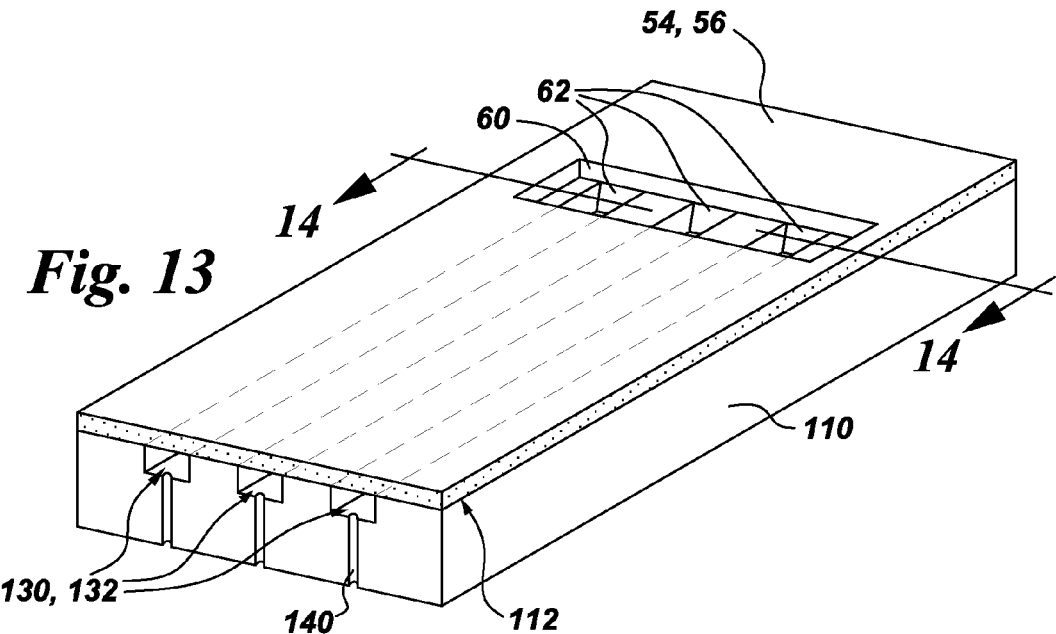
Figure 14:
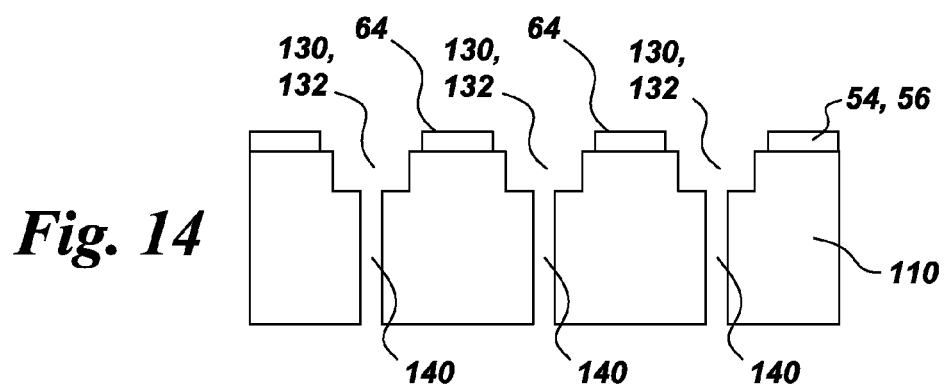
Figure 15:
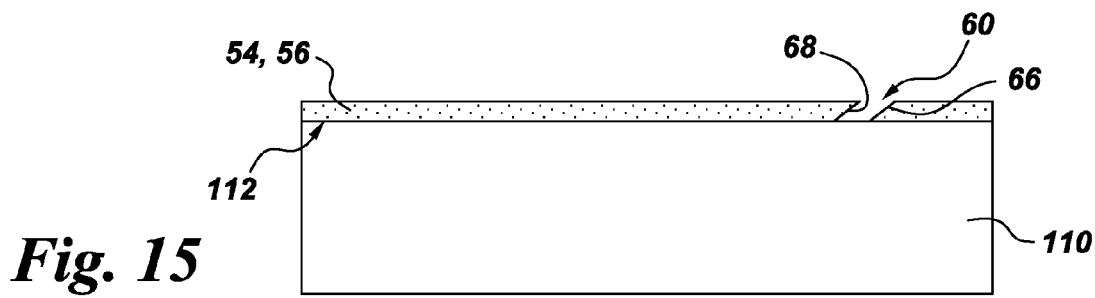
Figure 16:
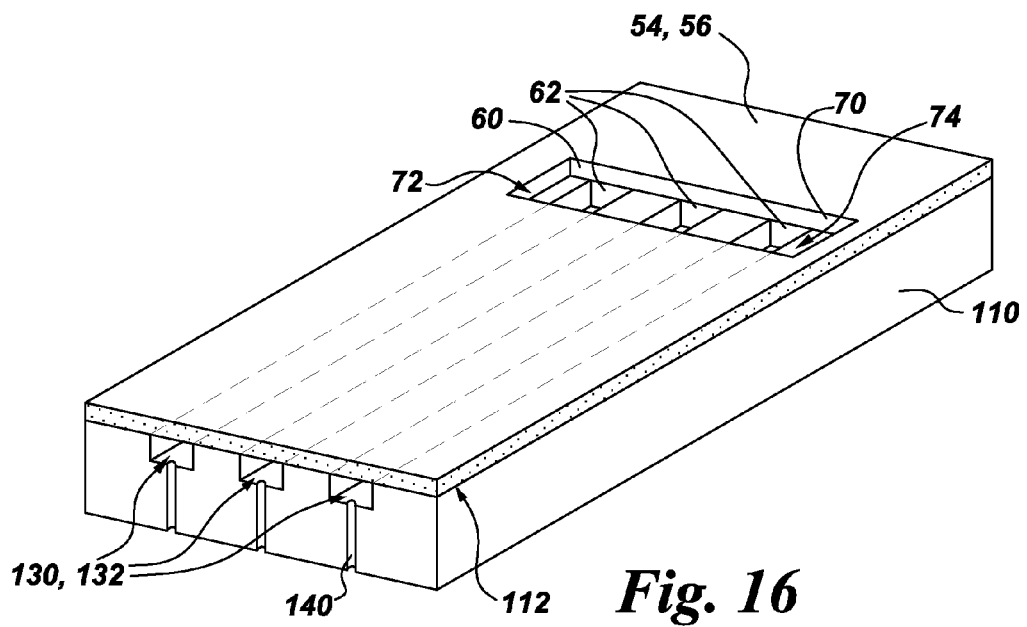
Figure 17:
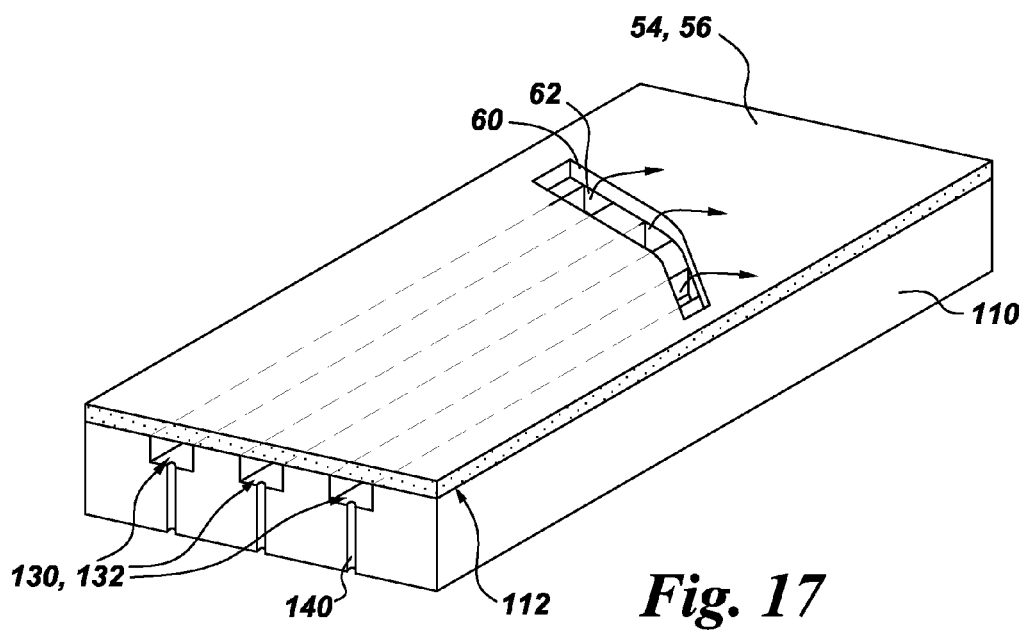

FIG. 3 schematically depicts, in perspective view, three example cooling channels that extend partially along the surface of the substrate and channel coolant to respective exit regions formed in a trench in the airfoil coating;

FIG. 4 is a cross-sectional view of one of the example cooling channels of FIG. 3 and shows the channel conveying coolant from an access hole to an exit region formed in a trench in the airfoil coating;

FIG. 5 is a cross-section of the component of FIG. 3 that does not coincide with one of the cooling channels;

FIG. 6 schematically depicts, in perspective view, three example re-entrant shaped cooling channels that extend partially along the surface of the substrate and channel coolant to respective exit regions formed in a trench in the airfoil coating;

FIG. 7 is a cross-section of a component with three example cooling channels, where each of the channels has a permeable slot;

FIG. 8 is a cross-section of a component with three example cooling channels, where each of the channels has a permeable slot that is sealed by the outer coating;

FIG. 9 schematically depicts, in perspective view, a section of a component with three example cooling channels and with a trench formed in the outer coating layers;

FIG. 10 is a cross-sectional view of one of the example cooling channels of FIG. 9 and shows the channel fluidly connected, via a film hole, to the trench formed in the outer coating layers;

FIG. 11 schematically depicts, in perspective view, three example cooling channels that are oriented at a non-orthogonal angle of incidence relative to a trench formed in the airfoil coating;

FIG. 12 schematically depicts, in perspective view, a section of a component with four example cooling channels and with two trenches formed in the coating;

FIG. 13 schematically depicts another trench configuration, where the trench defines exit regions separated by coating ridges;

FIG. 14 is a cross-sectional view of the example trench in FIG. 13;

FIG. 15 is a cross-section of a component that does not coincide with one of the cooling channels, where the trench has angled entrance and exit walls;

FIG. 16 schematically depicts another trench configuration, where the footprint of the trench is smaller at the first end of the trench than at the second end of the trench;

FIG. 17 illustrates an example curved trench configuration; and

Figure 18:
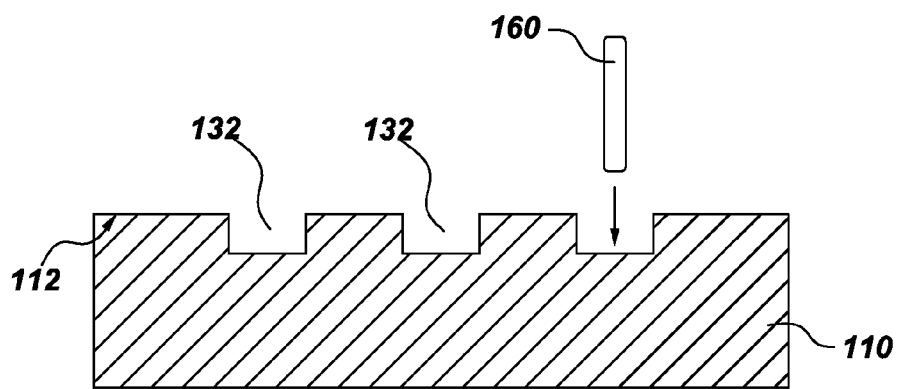
Figure 19:
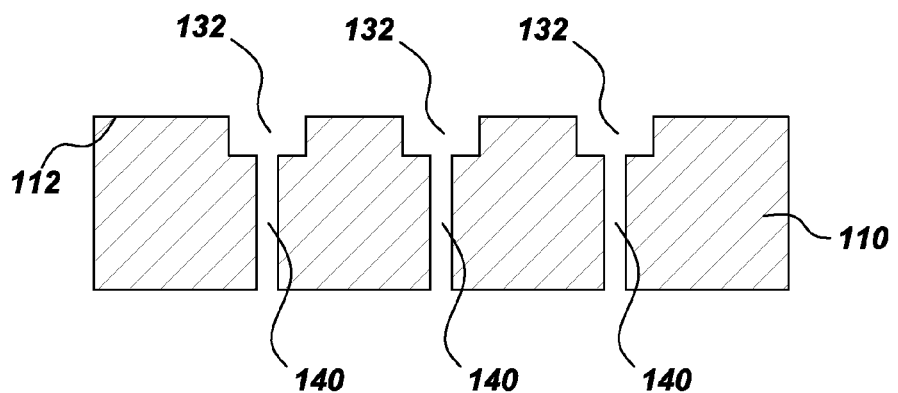
Figure 20:
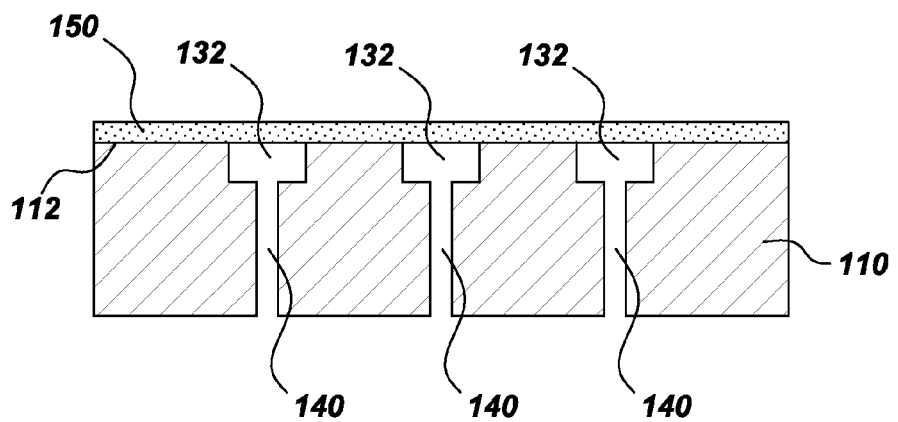

FIGS. 18-20 illustrate example process steps for forming a component.

DETAILED DESCRIPTION

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The modifier "about" used in connection with a quantity is inclusive of the stated value, and has the meaning dictated by context, (e.g., includes the degree of error associated with measurement of the particular quantity). In addition, the term "combination" is inclusive of blends, mixtures, alloys, reaction products, and the like.

Moreover, in this specification, the suffix "(s)" is usually intended to include both the singular and the plural of the term that it modifies, thereby including one or more of that term (e.g., "the passage hole" may include one or more passage holes, unless otherwise specified). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. In addition, it is to be understood that the described inventive features may be combined in any suitable manner in the various embodiments.

Figure 1:
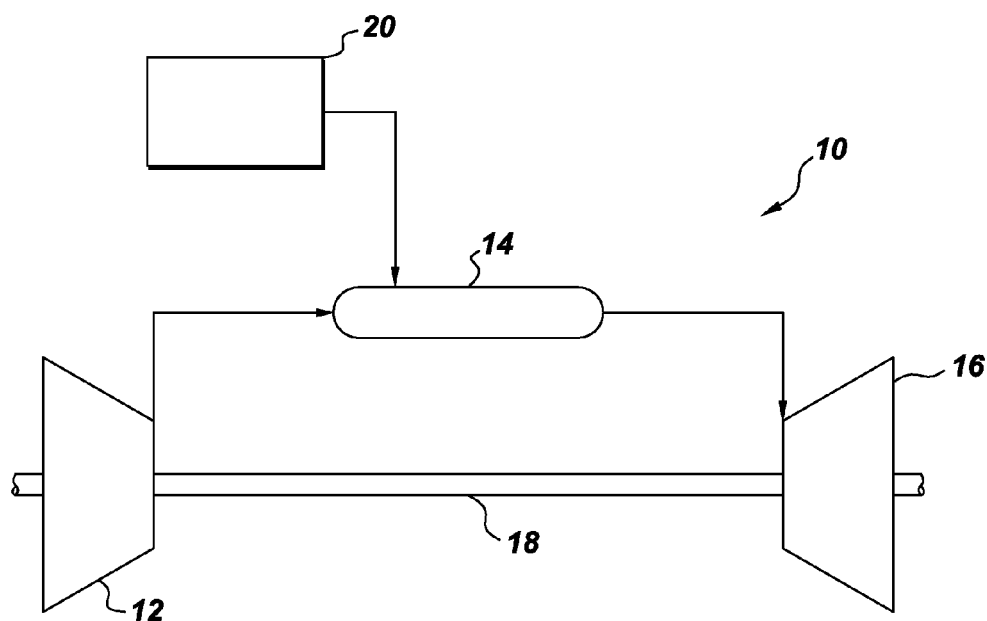
FIG. 1 is a schematic illustration of a gas turbine system.

FIG. 1 is a schematic diagram of a gas turbine system 10. The system 10 may include one or more compressors 12, combustors 14, turbines 16, and fuel nozzles 20. The compressor 12 and turbine 16 may be coupled by one or more shaft 18. The shaft 18 may be a single shaft or multiple shaft segments coupled together to form shaft 18.

The gas turbine system 10 may include a number of hot gas path components 100. A hot gas path component is any component of the system 10 that is at least partially exposed to a high temperature flow of gas through the system 10. For example, bucket assemblies (also known as blades or blade assemblies), nozzle assemblies (also known as vanes or vane assemblies), shroud assemblies, transition pieces, retaining rings, and compressor exhaust components are all hot gas path components. However, it should be understood that the hot gas path component 100 of the present invention is not limited to the above examples, but may be any component that is at least partially exposed to a high temperature flow of gas. Further, it should be understood that the hot gas path component 100 of the present disclosure is not limited to components in gas turbine systems 10, but may be any piece of machinery or component thereof that may be exposed to high temperature flows.

When a hot gas path component 100 is exposed to a hot gas flow 80, the hot gas path component 100 is heated by the hot gas flow 80 and may reach a temperature at which the hot gas path component 100 fails. Thus, in order to allow system 10 to operate with hot gas flow 80 at a high temperature, increasing the efficiency and performance of the system 10, a cooling system for the hot gas path component 100 is required.

In general, the cooling system of the present disclosure includes a series of small channels, or micro-channels, formed in the surface of the hot gas path component 100. The hot gas path component may be provided with a coating. A cooling fluid may be provided to the channels from a plenum, and the cooling fluid may flow through the channels, cooling the coating.

Figure 2:
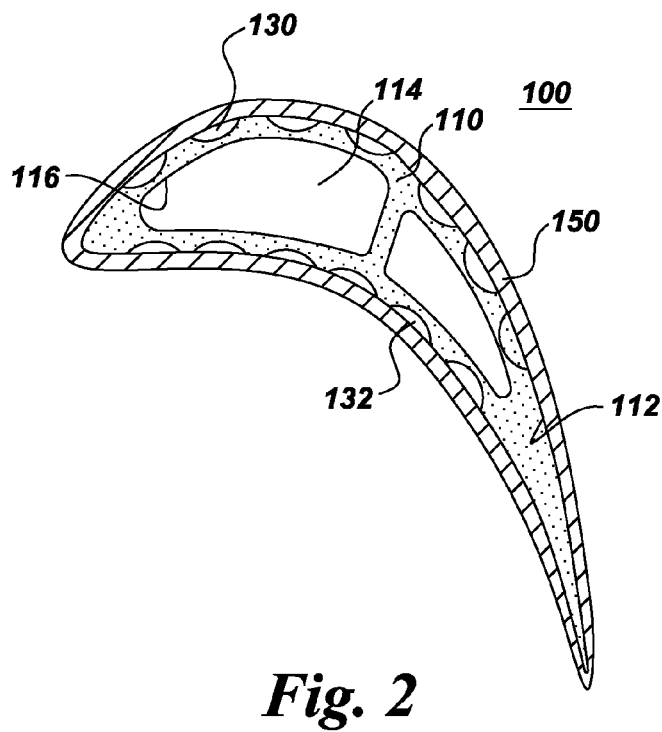
FIG. 2 is a schematic cross-section of an example airfoil configuration with cooling channels, in accordance with aspects of the present invention.

A component 100 is described with reference to FIGS. 2-17. As indicated, for example in FIG. 2, the component 100 includes a substrate 110 comprising an outer surface 112 and an inner surface 116. As indicated, for example, in FIG. 2, the inner surface 116 defines at least one hollow, interior space 114. As indicated, for example in FIGS. 2 and 3, the outer surface 112 defines one or more grooves 132. As indicated, for example, in FIGS. 3 and 11, each of the grooves 132 extends at least partially along the surface 112 of the substrate 110 and has a base 134.

The substrate 110 is typically cast prior to forming the grooves 132 in the surface 112 of the substrate 110. As discussed in commonly assigned U.S. Pat. No. 5,626,462, which is incorporated by reference herein in its entirety, substrate 110 may be formed from any suitable material, described herein as a first material. Depending on the intended application for component 100, this could include Ni-base, Co-base and Fe-base superalloys. The Ni-base superalloys may be those containing both γ and γ' phases, particularly those Ni-base superalloys containing both γ and γ' phases wherein the γ' phase occupies at least 40% by volume of the superalloy. Such alloys are known to be advantageous because of a combination of desirable properties including high temperature strength and high temperature creep resistance. First (substrate) material may also comprise a NiAl intermetallic alloy, as these alloys are also known to possess a combination of superior properties including high temperature strength and high temperature creep resistance that are advantageous for use in turbine engine applications used for aircraft. In the case of Nb-base alloys, coated Nb-base alloys having superior oxidation resistance will be preferred, such as Nb/Ti alloys, and particularly those alloys comprising Nb-(27-40)Ti-(4.5-10.5)Al-(4.5-7.9)Cr-(1.5-5.5) Hf-(0-6)V, where the composition ranges are in atom percent. First (substrate) material may also comprise a Nb-base alloy that contains at least one secondary phase, such as a Nb-containing intermetallic compound, comprising a silicide, carbide or boride. Such alloys are analogous to composites of a ductile phase (i.e., the Nb-base alloy) and a strengthening phase (i.e., a Nb-containing intermetallic compound). For other arrangements, the substrate material comprises a molybdenum based alloy, such as alloys based on molybdenum (solid solution) with $Mo_5SiB_2$ and $Mo_3Si$ second phases. For other configurations, the substrate material comprises a ceramic matrix composite, such as a silicon carbide (SiC) matrix reinforced with SiC fibers. For other configurations the substrate material comprises a TiAl-based intermetallic compound.

As indicated, for example, in FIG. 3, one or more access holes 140 are formed through the base 134 of a respective groove 132, to connect the groove 132 in fluid communication with the respective hollow interior space 114. The access holes 140 are typically circular or oval in cross-section and may be formed, for example using one or more of laser machining (laser drilling), abrasive liquid jet, electric discharge machining (EDM) and electron beam drilling. The access holes 140 may be normal to the base 134 of the respective grooves 132 (as shown in FIG. 6) or, more generally, may be drilled at angles in a range of 20-90 degrees relative to the base 134 of the groove.

The component 100 further includes a coating 150 comprising one or more layers 54, 56 disposed over at least a portion of the surface 112 of the substrate 110. As shown in FIG. 3, for example, the grooves 132 and the coating 150 together define one or more channels 130 for cooling the component 100. Typically, the channel length is in the range of 10 to 1000 times the film hole diameter, and more particularly, in the range of 20 to 100 times the film hole diameter. Beneficially, the channels 130 can be used anywhere on the surfaces of the components (airfoil body, lead edges, trail edges, blade tips, endwalls, platforms). In addition, although the channels are shown as having straight walls, the channels 130 can have any configuration, for example, they may be straight, curved, or have multiple curves.

Coating 150 conforms to airfoil-shaped outer surface 112 and covers grooves 132 forming channels 130. For certain configurations, coating 150 may just be the first coating or structural coating that covers the channels. Namely, for certain applications, no additional coating is used. However, for other applications, a bondcoat and/or a thermal barrier coating (TBC) are also used. Coating 150 comprises a second material, which may be any suitable material and is bonded to the airfoil-shaped outer surface of substrate 110. For particular configurations, the coating 150 has a thickness in the range of 0.1-2.0 millimeters, and more particularly, in the range of 0.1 to 1 millimeters, and still more particularly 0.1 to 0.5 millimeters for industrial components. For aviation components, this range is typically 0.1 to 0.25 millimeters. However, other thicknesses may be utilised depending on the requirements for a particular component 100.

As indicated, for example, in FIGS. 3-6 and 9-16, one or more trenches 60 are formed through one or more layers 54, 56 of the coating 150. As indicated, for example, in FIGS. 3 and 4, the one or more trenches 60 at least partially define at least one exit region 62 for the cooling channel(s) 130. For the example configuration shown in FIGS. 3 and 4, the coating 150 comprises at least a structural coating 54 and an outer coating 56, and the trench 60 extends through the structural coating 54 and the outer coating 56 to define the exit regions 62 for the cooling channels 130. Beneficially, each trench cuts directly over the cooling channel region, eliminating the need for precision location of individual film holes. In this manner, film cooling can be provided using simplified machining processes.

The grooves 132 may be straight or curved and have straight or curved walls. For the configuration shown in FIG. 6, the base 134 is wider than the top 136 of the respective groove 132, such that each groove 132 comprises a re-entrant shaped groove 132, and such that each channel 130 comprises a re-entrant shaped channel 130. Various properties and benefits of re-entrant shaped channels 130, as well as techniques for forming re-entrant shaped channels 130 are described in U.S. patent application Ser. No. 12/943,624, Ronald S. Bunker et al., "Components with re-entrant shaped cooling channels and methods of manufacture," which patent application is incorporated by reference herein in its entirety.

For particular configurations, the base 134 of a respective one of the re-entrant shaped grooves 132 is at least two times wider than the top 136 of the respective groove 132. For more particular configurations, the base 134 of the respective re-entrant shaped groove 132 is at least three times, and more particularly, is in a range of about 3-4 times wider than the top 136 of the respective groove 132. Techniques for forming re-entrant grooves 132 are provided in U.S. patent application Ser. No. 12/943,624, Bunker et al. Beneficially, the coating 150 can be deposited over unfilled re-entrant grooves 132 (that is, without the filling or partial filling the groove with a sacrificial filler). In addition, the re-entrant grooves provide enhanced cooling relative to a simple shaped groove (namely, grooves with tops 136 and bases of approximately equal width).

Similarly, for smaller components, the grooves may be small enough, such that the coating 150 can be deposited over unfilled grooves 132 (with arbitrary shapes, that is they need not be re-entrant shaped) without filling or partial filling of the groove. This could be the case for smaller, for example, aviation-sized components.

For the example configurations illustrated in FIGS. 7 and 8, at least one of the coating layers 54, 56 defines one or more permeable slots 144, such that the respective layer 54, 56 does not completely bridge each of the one or more grooves 132. More particularly, for the arrangement shown in FIG. 7, the coating 150 comprises at least a structural coating 54 and an outer coating 56. As shown in FIG. 7, the outer coating 56 does not completely bridge the permeable slots 144 formed in structural coating 54, such that the permeable slots 144 extend through the outer coating 56. However, for the example configuration depicted in FIG. 8, at least one layer of the outer coating 56 completely bridges the respective grooves 132, thereby sealing the respective channels 130. The formation of permeable slots 144 is described in commonly assigned, U.S. patent application Ser. No. 12/943,646, Ronald Scott Bunker et al., "Component and methods of fabricating and coating a component," which patent application is hereby incorporated by reference herein in its entirety.

As discussed in U.S. patent application Ser. No. 12/943,646, Bunker et al., permeable slots 144 may be formed for a variety of channel geometries. Typically the permeable slots (gaps) 144 have irregular geometries, with the width of the gap 144 varying, as the structural coating is applied and builds up a thickness. Initially, as the first part of the structural coating is applied to the substrate 110, the width of the gap 144 may be as much as 50% of the width of the top 136 of the micro-channel 130. The gap 144 may then narrow down to 5% or less of the width of the top 136, as the structural coating is built up. For particular examples, the width of gap 144, at its narrowest point, is 5% to 20% of the width of the respective channel top 136. In addition, the permeable slot 144 may be porous, in which case the "porous" gap 144 may have some connections, that is, some spots or localities that have zero gap. Beneficially, the gaps 144 provide stress relief for the coating 150.

Depending on their specific function, the permeable slots 144, may extend either (1) through all of the coating layers as shown in FIG. 7 or (2) through some but not all coatings, for example, a permeable slot 144 may be formed in one or more coating layers 50 with a subsequently deposited layer bridging the slots, thereby effectively sealing the slots 144 as shown in FIG. 8. Beneficially, the permeable slot 144 can function as a stress/strain relief for the structural coating(s). In addition, the permeable slot 144 can serve as a cooling means when it extends through all coatings (FIG. 7), that is, for this configuration, the permeable slots 144 are configured to convey a coolant fluid from the respective channels 130 to an exterior surface of the component. Further, the permeable slot 144 can serve as a passive cooling means when bridged by the upper coatings (FIG. 8), in the case when those coatings are damaged or spalled.

The trench(es) 60 may be oriented at a variety of angles relative to the cooling channels 130. For the example configurations shown in FIGS. 3, 6 and 9, the respective trenches 60 are oriented approximately perpendicular to the cooling channels 130. As used here, the term "approximately" should be understood to mean within +/−10°. For the example configuration shown in FIG. 11, the trench 60 has a non-orthogonal angle of incidence relative to the cooling channels 130. That is, for this arrangement, the trench(s) 60 and the channels 130 are not at right angles. For example, for the arrangement shown in FIG. 11, the non-orthogonal orientation between the trench 60 and the channels 130 would benefit the distribution of film coolant relative to the direction of hot gas flow.

For certain configurations, only a single trench 60 is provided for a given set of cooling channels 100, as indicated for example in FIGS. 3, 6, 9, and 11. However, for other configurations, multiple trenches 60 are formed through the one or more coating layers 54, 56. FIG. 12 depicts one such example arrangement. However, the arrangement shown in FIG. 12 is merely illustrative.

The trenches 60 may be continuous or interrupted. That is, the continuous trenches 60 may have an approximately constant depth or a smooth but tapered or curved depth. An example, interrupted trench 60 is shown in FIGS. 13 and 14. For the illustrated arrangement, multiple grooves 132 are formed in the substrate, such that multiple cooling channels 130 are defined by the coating 150 and the grooves 132. As indicated in FIG. 14, the trench 60 includes one or more coating ridges 64 adjacent to respective exit regions 62. For the example arrangement shown in FIGS. 13 and 14, the coating ridges separate neighboring exit regions 62. However, for the arrangement shown in FIG. 3, the trench 60 does not include a coating ridge but instead comprises a continuous trench.

Although the trenches shown in FIGS. 4, 5, 10, and 14 have walls that are approximately perpendicular to the top of the channels, for other configurations, the trench walls may be formed at other angles relative to the channels. For example, the trench 60 may have an angled exit wall 66, as indicated in FIG. 15. For the example arrangement shown in FIG. 15, the trench 60 includes both an angled exit wall 66 and an angled entrance wall 68. In addition, although the entrance and exit walls 68, 66 are shown as being straight, they may also be curved or rounded.

The trenches 60 may have symmetric or asymmetric footprints. For example, for the trenches 60 shown in FIGS. 3, 6, 9, and 11-13, the footprint of the respective trench is the same at the two ends of the trench. For the configuration shown in FIG. 16, however, the footprint 70 of the trench 60 is smaller at the first end 72 of the trench 60 than at the second end 74 of the trench 60. In addition, although the cooling channels 130 are shown as being evenly spaced, for other configurations (not expressly shown), the channels 130 are spaced closer together near the second end 74 of the trench 60 than they are near the first end 72 of the trench 60. Further, although the cooling channels 130 are shown as having the same volume, for other configurations (not expressly shown), the cooling channels 130 near the first end 72 of the trench 60 are smaller in volume than at least some of the cooling channels 130 near the second end 74 of the trench 60. Moreover, although the trenches 60 shown in FIGS. 3, 6, 9, and 11-13, comprise straight trenches 60, for the arrangement shown in FIG. 17, the trench 60 comprises a curved trench 60. Similarly, the walls of the trench may be straight, as shown in FIG. 3, angled as shown in FIG. 15 or curved (not expressly shown).

For the example arrangement shown in FIGS. 9 and 10, the coating 150 comprises a structural coating 54 and an outer coating 56, and the trench 60 extends through the outer coating 56 but does not extend completely through the structural coating 54. For the illustrated arrangement, film cooling holes 142 extend through the structural coating 54 to connect the respective cooling channels 130 with the trench 60. The film holes 142 may be round or may also be non-circular shaped holes. For this configuration, the film cooling holes 142 and the trench 60 define the exit regions 62 for the cooling channels 130. Thus, for the example configuration shown in FIGS. 9 and 10, the micro-channel 130 conveys coolant from an access hole 140 to a film cooling hole 142. For this configuration, the orientation of the film cooling holes 142 may be aligned with that of the trenches for certain arrangements. However, for other arrangements, the orientation of the film cooling holes 142 differs from the orientation of the trench (es) 60, as indicated by the direction of the coolant flow from the exit regions 62 in FIG. 11. By providing for different orientations of the film cooling holes 142 and the trench(es) 60, cooling may be further enhanced.

A method of fabricating a component 100 is described with reference to FIGS. 2-6, 9-13, and 15-20. As indicated, for example, in FIG. 18, the fabrication method includes forming one or more grooves 132 in a surface 112 of a substrate 110. As discussed above with reference to FIG. 2, the substrate 110 has at least one hollow interior space 114. As indicated, for example, in FIG. 3, each of the grooves 132 extends at least partially along the surface 112 of the substrate 110 and has a base 134. Although the grooves 132 and channels 130 are shown as being rectangular in the figures, they may also take on other shapes. For example, the grooves 132 (and channels 130) may be re-entrant grooves 132 (re-entrant channels 130), as described above with reference to FIG. 6. In addition, the side-walls of the grooves 132 (channels 130) need not be straight. For various applications, the side-walls of the grooves 132 (channels 130) may be curved or rounded.

The grooves 132 may be formed using a variety of techniques. For example, the grooves 132 may be formed using one or more of an abrasive liquid jet, plunge electrochemical machining (ECM), electric discharge machining (EDM) with a spinning single point electrode ("milling" EDM) and laser machining (laser drilling). Example laser machining techniques are described in commonly assigned, U.S. patent application Ser. No. 12/697,005, "Process and system for forming shaped air holes" filed Jan. 29, 2010, which is incorporated by reference herein in its entirety. Example EDM techniques are described in commonly assigned U.S. patent application Ser. No. 12/790,675, "Articles which include chevron film cooling holes, and related processes," filed May 28, 2010, which is incorporated by reference herein in its entirety.

For particular process configurations, the grooves 132 are formed by directing an abrasive liquid jet 160 at the surface 112 of the substrate 110, as schematically depicted in FIG. 18. Example water jet drilling processes and systems are provided in U.S. patent application Ser. No. 12/790,675. As explained in U.S. patent application Ser. No. 12/790,675, the water jet process typically utilizes a high-velocity stream of abrasive particles (e.g., abrasive "grit"), suspended in a stream of high pressure water. The pressure of the water may vary considerably, but is often in the range of about 35-620 MPa. A number of abrasive materials can be used, such as garnet, aluminum oxide, silicon carbide, and glass beads. Beneficially, the water jet process does not involve heating of the substrate 110 to any significant degree. Therefore, there is no "heat-affected zone" formed on the substrate surface 112, which could otherwise adversely affect the desired exit geometry for the grooves 132.

In addition, and as explained in U.S. patent application Ser. No. 12/790,675, the water jet system can include a multi-axis computer numerically controlled (CNC) unit. The CNC systems themselves are known in the art, and described, for example, in U.S. Patent Publication 2005/0013926 (S. Rutkowski et al), which is incorporated herein by reference. CNC systems allow movement of the cutting tool along a number of X, Y, and Z axes, as well as rotational axes.

As indicated in FIG. 19, the fabrication method further includes forming one or more access holes 140 through the base 134 of a respective one of the grooves 132, to connect the groove 132 in fluid communication with the respective hollow interior space 114. Access holes are described above and may be formed, for example using one or more of laser machining (laser drilling), abrasive liquid jet, electric discharge machining (EDM) and electron beam drilling.

As indicated in FIG. 20, the fabrication method further includes depositing a coating 150 over at least a portion of the surface 112 of the substrate 110, such that the grooves 132 and the coating 150 together define one or more channels 130 for cooling the component 100. This may include depositing one or more layers 54 of a structural coating and optionally depositing additional coating layers 56 over the structural coating 54. For example, a bondcoat and/or a thermal barrier coating (TBC) may be used for certain applications. However, for other applications, no additional coating is used. The structural coating 54 and optional additional coating 56 may be deposited using a variety of techniques. For particular processes, the structural coating 54 is deposited by performing an ion plasma deposition (cathodic arc). Example ion plasma deposition apparatus and method are provided in commonly assigned, US Published Patent Application No. 20080138529, Weaver et al, "Method and apparatus for cathodic arc ion plasma deposition," which is incorporated by reference herein in its entirety. Briefly, ion plasma deposition comprises placing a cathode formed of a coating material into a vacuum environment within a vacuum chamber, providing a substrate 110 within the vacuum environment, supplying a current to the cathode to form a cathodic arc upon a cathode surface resulting in arc-induced erosion of coating material from the cathode surface, and depositing the coating material from the cathode upon the substrate surface 112.

In one non-limiting example, the ion plasma deposition process comprises a plasma vapor deposition process. Non-limiting examples of the coating include structural coating 54, as well as bond coatings and oxidation-resistant coatings (which are individually and collectively identified by reference numeral 56 herein), as discussed in greater detail below with reference to U.S. Pat. No. 5,626,462. For certain hot gas path components 100, the structural coating 54 comprises a nickel-based or cobalt-based alloy, and more particularly comprises a superalloy or a (NiCo)CrAlY alloy. For example, where the substrate material is a Ni-base superalloy containing both γ and γ' phases, structural coating 54 may comprise similar compositions of materials, as discussed in greater detail below with reference to U.S. Pat. No. 5,626,462.

For other process configurations, the structural coating 54 is deposited by performing at least one of a thermal spray process and a cold spray process. For example, the thermal spray process may comprise combustion spraying or plasma spraying, the combustion spraying may comprise high velocity oxygen fuel spraying (HVOF) or high velocity air fuel spraying (HVAF), and the plasma spraying may comprise atmospheric (such as air or inert gas) plasma spray, or low pressure plasma spray (LPPS, which is also know as vacuum plasma spray or VPS). In one non-limiting example, a NiCrAlY coating is deposited by HVOF or HVAF. Other example techniques for depositing the structural coating 54 include, without limitation, sputtering, electron beam physical vapor deposition, electroless plating, and electroplating.

For certain configurations, it is desirable to employ multiple deposition techniques for depositing the structural 54 and optional additional 56 coating layers. For example, a first coating layer may be deposited using an ion plasma deposition, and a subsequently deposited layer and optional additional layers (not shown) may be deposited using other techniques, such as a combustion spray process or a plasma spray process. Depending on the materials used, the use of different deposition techniques for the coating layers may provide benefits in strain tolerance and/or in ductility.

More generally, and as discussed in U.S. Pat. No. 5,626,462, the material used to form coating 150 comprises any suitable material. For the case of a cooled turbine component 100, the structural coating material must be capable of withstanding temperatures up to about 1150° C., while the TBC can withstand temperatures up to about 1425° C. The structural coating 54 must be compatible with and adapted to be bonded to the airfoil-shaped outer surface 112 of substrate 110, as discussed in commonly assigned, U.S. patent application Ser. No. 12/943,563, Bunker et al. "Method of fabricating a component using a fugitive coating," which patent application is hereby incorporated herein in its entirety.

As discussed in U.S. Pat. No. 5,626,462, where the substrate material is an Ni-base superalloy containing both γ and γ' phases or a NiAl intermetallic alloy, the materials for the structural coating 54 may comprise similar compositions of materials to the substrate. Such a combination of coating 54 and substrate 110 materials is preferred for particular applications, such as where the maximum temperatures of the operating environment are similar to those of existing engines (e.g. below 1650° C.). In the case where the first material of substrate 110 is a Nb-base alloy, NiAl-based intermetallic alloy, or TiAl-based intermetallic alloy, the structural coating 54 may likewise comprise similar material compositions.

As discussed in U.S. Pat. No. 5,626,462, for other applications, such as applications that impose temperature, environmental or other constraints that make the use of a monolithic metallic or intermetallic alloy coating 54 inadequate, it is preferred that the structural coating 54 comprise composites. The composites can consist of intermetallic and metal alloy ($I_S$+M) phases and intermetallic-intermetallic (+$I_M$) phases. Metal alloy M may be the same alloy as used for the substrate 110, or a different material, depending on the requirements of the component 100. Further, the two constituent phases must be chemically compatible, as discussed in U.S. patent application Ser. No. 12/943,563, Bunker et al. It is also noted that within a given coating, multiple $I_S$+M or $I_S$+$I_M$ composites may also be used, and such composites are not limited to two-material or two-phase combinations. Additional details regarding example structural coating materials are provided in U.S. Pat. No. 5,626,462.

Referring now to FIGS. 3-6, 9-13, 15 and 16, the fabrication method further includes forming one or more trenches 60 through one or more layers 54, 56 of the coating 150 to at least partially define at least one exit region 62 for the cooling channel(s) 130. For particular configurations, the coating 150 comprises at least a structural coating 54 and an outer coating 56. For the example arrangements shown in FIGS. 3, 4, 6 and 11-16, the one or more trenches 60 are formed to extend through the structural coating 54 and the outer coating 56 to define the at least one exit region 62 for the one or more cooling channels 130. Beneficially, by removing the coatings as a shallow trench that connects multiple channel exits/ends (and thereby exposing the channel ends as cooling "holes" that inject their flow into the trench) using an operation, such as abrasive water jet removal, to cleanly and precisely remove a strip of the coatings for several micro channels in a row, manufacturing costs are reduced, while maintaining film performance.

More generally, the trench(es) 60 may be formed using one or more of an abrasive liquid jet, plunge electrochemical machining (ECM), electric discharge machining (EDM) with a spinning electrode (milling EDM), laser machining and conventional computer numerical controlled (CNC) milling. Each of these techniques can be used to machine metallic coatings. If one or more of the coatings is non-metallic, then the trench(es) may be formed using one or more of an abrasive liquid jet, laser machining and conventional CNC milling. Example water jet drilling processes and systems are discussed above with reference to U.S. patent application Ser. No. 12/790,675. As noted above, example laser machining techniques are described in U.S. patent application Ser. No. 12/697,005, and example EDM techniques are described in U.S. patent application Ser. No. 12/790,675. For other process configurations, the trench(es) 60 may be formed using a masking technique, in which case the coatings are deposited using a mask, such that the coatings are not applied in the trench(es) 60. Masking methods typically require additional post-machining steps, for example using one or more of the material removal techniques noted above.

For many hot gas path component configurations, the coating 150 comprises at least a structural coating 54 and an outer coating 56. For the example configuration shown in FIGS. 9 and 10, the trenches 60 is formed to extend through the outer coating 56 but not to extend completely through the structural coating 54. For this configuration, the method further includes forming one or more film cooling holes 142 through the structural coating 54 to connect the respective cooling channel(s) 130 with the respective trench 60, as shown, for example, in FIG. 10. For this configuration, the film cooling hole(s) 142 and the trench(es) 60 define the at least one exit region (62). Film cooling holes 142 may be formed using one or more of a variety of techniques, including abrasive liquid jet, plunge ECM, EDM with a spinning electrode (milling EDM), conventional EDM (the electrode does not spin) and laser machining.

Beneficially, the incorporation of trenches into the surface of hot gas path components provides a relatively inexpensive means for forming exit regions for cooling channels that extend along the surface of the component's substrate. In addition, the trenches may further serve to enhance cooling of the surface of the hot gas path components by keeping the coolant exiting the channels in close contact with the hot surface, rather than separating from it quickly, and undesirably mixing with the combustion gases. Further, the use of trenches to at least partially define the exit regions for the cooling channels enables more flexible orientation of the film cooling relative to the layout of the cooling channels, which may further enhance cooling.

Although only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A component comprising
a substrate comprising an outer surface and an inner surface, wherein the inner surface defines at least one hollow, interior space, wherein the outer surface defines one or more grooves, wherein each groove extends at least partially along the outer surface of the substrate and has a base, wherein one or more access holes are formed through the base of a respective groove, to connect the groove in fluid communication with respective ones of the at least one hollow interior space; and
a coating comprising one or more layers disposed over at least a portion of the outer surface of the substrate, wherein the one or more grooves and the coating together define one or more channels for cooling the component, wherein one or more trenches are formed through one or more layers of the coating, wherein the channels are at least one of spaced closer together near a second end of the trench than they are near a first end of the trench or smaller in volume near the first end of the trench than at least some of the cooling channels near the second end of the trench and wherein the one or more trenches at least partially define at least one exit region for the one or more cooling channels.

2. The component of claim 1, wherein the coating comprises at least a structural coating and an outer coating, and wherein the one or more trenches extend through the structural coating and the outer coating to define the at least one exit region for the one or more cooling channels.

3. The component of claim 1, wherein each of the one or more grooves has a top, wherein the base of the respective groove is wider than the top, such that each groove comprises a re-entrant shaped groove, and such that each channel comprises a re-entrant shaped channel.

4. The component of claim 1, wherein at least one of the layers defines one or more permeable slots, such that the respective layer does not completely bridge each of the one or more grooves.

5. The component of claim 4, wherein the coating comprises at least a structural coating and an outer coating, and wherein the outer coating does not completely bridge the permeable slots formed in structural coating, such that the permeable slots extend through the outer coating.

6. The component of claim 4, wherein the coating comprises at least a structural coating and an outer coating, and wherein at least one layer of the outer coating bridges the permeable slots formed in the structural coating, thereby substantially sealing the permeable slots.

7. The component of claim 1, wherein a plurality of grooves are formed in the substrate, wherein a plurality of cooling channels are defined by the coating and the grooves, and wherein at least one of the one or more trenches is oriented approximately perpendicular to the cooling channels.

8. The component of claim 1, wherein a plurality of grooves are formed in the substrate, wherein a plurality of cooling channels are defined by the coating and the grooves, and wherein at least one of the one or more trenches has a non-orthogonal angle of incidence relative to the cooling channels.

9. The component of claim 1, wherein a plurality of trenches are formed through the one or more layers of the coating.

10. The component of claim 1, wherein a plurality of grooves are formed in the substrate, wherein a plurality of cooling channels are defined by the coating and the grooves, and wherein at least one of the one or more trenches includes one or more coating ridges adjacent to respective exit regions.

11. The component of claim 1, wherein the one or more trench has an angled exit wall.

12. A component comprising:
a substrate comprising an outer surface and an inner surface, wherein the inner surface defines at least one hollow, interior space, wherein the outer surface defines one or more grooves, wherein each groove extends at least partially along the outer surface of the substrate and has a base, wherein one or more access holes are formed through the base of a respective groove, to connect the groove in fluid communication with respective ones of the at least one hollow interior space; and
a coating comprising one or more layers disposed over at least a portion of the outer surface of the substrate, wherein the one or more grooves and the coating together define one or more channels for cooling the component, wherein one or more trenches are formed through one or more layers of the coating, and wherein the one or more trenches at least partially define at least one exit region for the one or more cooling channels, wherein a footprint of the trench is smaller at a first end of the trench than at a second end of the trench.

13. The component of claim 12, wherein a plurality of grooves are formed in the substrate, wherein a plurality of cooling channels are defined by the coating and the grooves, and wherein the channels are spaced closer together near the second end of the trench than they are near the first end of the trench.

14. The component of claim 12, wherein a plurality of grooves are formed in the substrate, wherein a plurality of cooling channels are defined by the coating and the grooves, and wherein the cooling channels near the first end of the trench are smaller in volume than at least some of the cooling channels near the second end of the trench.

15. The component of claim 1, wherein at least one of the one or more trenches comprises a straight trench.

16. The component of claim 1, wherein at least one of the one or more trenches comprises a curved trench.

17. The component of claim 1, wherein the coating comprises at least a structural coating and an outer coating, wherein the one or more trenches extend through the outer coating but do not extend completely through the structural coating, wherein one or more film cooling holes extend through the structural coating to connect the respective one or more cooling channels with the respective trench, such that the one or more film cooling holes and the one or more trenches define the at least one exit region.

18. The component of claim 17, wherein the orientation of the one or more film cooling holes differs from the orientation of the one or more trenches.

19. A method of fabricating a component, the method comprising:

forming one or more grooves in an outer surface of a substrate, wherein the substrate has at least one hollow interior space, wherein each groove extends at least partially along the outer surface of the substrate and has a base;
forming one or more access holes through the base of a respective one of the one or more grooves, to connect the groove in fluid communication with respective ones of the at least one hollow interior space;
depositing a coating over at least a portion of the outer surface of the substrate, such that the one or more grooves and the coating together define one or more channels for cooling the component; and
forming one or more trenches through one or more layers of the coating to at least partially define at least one exit region for the one or more cooling channels, wherein a footprint of each of the one or more trenches is smaller at a first end of the trench than at a second end of the trench.

20. The method of claim 19, wherein the coating comprises at least a structural coating and an outer coating, and wherein the one or more trenches are formed to extend through the structural coating and the outer coating to define the at least one exit region for the one or more cooling channels.

21. The method of claim 19, wherein the one or more trenches are formed using one or more of an abrasive liquid jet, plunge electrochemical machining (ECM), electric discharge machining (EDM) with a spinning electrode (milling EDM), laser machining, computer numerically controlled (CNC) milling, and a mask.

22. The method of claim 19, wherein the coating comprises at least a structural coating and an outer coating, wherein the one or more trenches are formed to extend through the outer coating but not to extend completely through the structural coating, the method further comprising:
forming one or more film cooling holes through the structural coating to connect the respective one or more cooling channels with the respective trench, such that the one or more film cooling holes and the one or more trenches define the at least one exit region.

23. A component comprising
a substrate comprising an outer surface and an inner surface, wherein the inner surface defines at least one hollow, interior space, wherein the outer surface defines one or more grooves, wherein each groove extends at least partially along the outer surface of the substrate and has a base, wherein one or more access holes are formed through the base of a respective groove, to connect the groove in fluid communication with respective ones of the at least one hollow interior space; and
a coating comprising one or more layers disposed over at least a portion of the outer surface of the substrate, wherein the one or more grooves and the coating together define one or more channels for cooling the component, wherein one or more trenches are formed through one or more layers of the coating, wherein at least one of the one or more trenches comprises a curved trench and wherein the one or more trenches at least partially define at least one exit region for the one or more cooling channels.

* * * * *